(12) United States Patent
Shmilovich et al.

(10) Patent No.: US 8,276,852 B2
(45) Date of Patent: Oct. 2, 2012

(54) LOW NOISE WING SLAT SYSTEM WITH DEPLOYABLE WING LEADING EDGE ELEMENTS

(75) Inventors: Arvin Shmilovich, Huntington Beach, CA (US); Yoram Yadlin, Irvine, CA (US)

(73) Assignee: The Boeing Company, Chicago, IL (US)

( * ) Notice: Subject to any disclaimer, the term of this patent is extended or adjusted under 35 U.S.C. 154(b) by 165 days.

(21) Appl. No.: 12/751,419

(22) Filed: Mar. 31, 2010

(65) Prior Publication Data

US 2011/0240803 A1    Oct. 6, 2011

(51) Int. Cl.
*B64C 3/50* (2006.01)
(52) U.S. Cl. .................... 244/214; 244/213
(58) Field of Classification Search .............. 244/130, 244/198, 200, 213, 214
See application file for complete search history.

(56) References Cited

U.S. PATENT DOCUMENTS

| | | | |
|---|---|---|---|
| 4,285,482 A | 8/1981 | Lewis | |
| 4,399,970 A | 8/1983 | Evans | |
| 4,702,441 A | 10/1987 | Wang | |
| 4,752,049 A | 6/1988 | Cole | |
| 6,328,265 B1 | 12/2001 | Dizdarevic | |
| 6,394,396 B2 | 5/2002 | Gleine et al. | |
| 6,454,219 B1 | 9/2002 | Moe | |
| 6,457,680 B1 | 10/2002 | Dobrzynski et al. | |
| 6,536,714 B2 | 3/2003 | Gleine et al. | |
| 6,789,769 B2 | 9/2004 | Mau et al. | |
| 7,270,305 B2 | 9/2007 | Rampton et al. | |
| 2002/0195527 A1* | 12/2002 | Broadbent | 244/214 |
| 2008/0179464 A1* | 7/2008 | Bender et al. | 244/216 |

FOREIGN PATENT DOCUMENTS

| | | |
|---|---|---|
| DE | 10 2004 056537 A1 | 6/2006 |
| EP | 1 147 985 A2 | 10/2001 |
| FR | 1 011 175 A | 6/1952 |

OTHER PUBLICATIONS

Andreou, et al., Abstract entitled, "Aeroacoustic Comparison of Airfoil Leading Edge High-Life Geometries and Supports," presented at the 45th American Institute of Aeronautics and Astronautics (AAIA) Aerospace Sciences Meeting and Exhibit, Jan. 8-11, 2007, Reno, Nevada; AIAA 2007-230; 20 Pages.

Kolb, et al., Abstract entitled, "Aeroacoustic Wind Tunnel Measurements on a 2D High-Lift Configuration," presented at the 13th AIAA/CEAS Aeroacoustics Conference, 28th American Institute of Aeronautics and Astronautics (AAIA) Aeroacoustics Conference, May 21-23, 2007, Reno, Nevada; AIAA 2007-3447; 19 Pages.

(Continued)

*Primary Examiner* — Tien Dinh
*Assistant Examiner* — Nicholas McFall
(74) *Attorney, Agent, or Firm* — Hope Baldauff Hartman, LLC (57) ABSTRACT

Concepts and technologies described herein provide for a low noise aircraft wing slat system. According to one aspect of the disclosure provided herein, a cove-filled wing slat is used in conjunction with a moveable leading edge element of an aircraft wing to provide a high lift system. The moveable leading edge element may include a one-piece or two-piece panel that retracts within the aircraft wing to accommodate the cove-filled slat in the stowed position. Upon deployment of the cove-filled slat, the moveable leading edge element deploys outward to create a continuous outer mold line shape with the wing.

19 Claims, 5 Drawing Sheets

OTHER PUBLICATIONS

Imamura, et al., Abstract entitled, "Designing of Slat Cove Filler as a Noise Reduction Device for Leading-Edge Slat," presented at the 13th AIAA/CEAS Aeroacoustics Conference, 28th American Institute of Aeronautics and Astronautics (AAIA) Aeroacoustics Conference, May 21-23, 2007, Reno, Nevada; AIAA 2007-3473; 17 Pages.

Imamura, et al., Abstract entitled, "Numerical and Experimental Research of Low-Noise Slat Using Simplified High-Lift Model," presented at the 14th AIAA/CEAS Aeroacoustics Conference, 29th American Institute of Aeronautics and Astronautics (AAIA) Aeroacoustics Conference, May 5-7, 2008, Vancouver, British Columbia Canada; AIAA 2008-2918; 18 Pages.

International Search Report and Written Opinion dated Jul. 19, 2011 in PCT/US2011/026479.

U.S. Office Action dated May 30, 2012 in U.S. Appl. No. 12/751,514.

U.S. Office Action dated Apr. 16, 2012 in U.S. Appl. No. 12/751,468.

* cited by examiner

LOW NOISE WING SLAT SYSTEM WITH DEPLOYABLE WING LEADING EDGE ELEMENTS

BACKGROUND

Reducing noise levels associated with airport environments has become a progressively higher priority within the aircraft industry. However, increasingly stringent noise regulations have resulted in an increase in air traffic inefficiencies and a reduction in airport productivity. For example, at many airports, current capacity is largely controlled by the hours of operations, which are typically confined to mostly daylight hours in order to prevent or mitigate noise pollution. During aircraft takeoff, approach, and landing operations, noise is generated in large part by the aircraft engines and airframe components. With the advent of high bypass ratio engines, a significant reduction in engine noise has been achieved, with continued advancements being made.

A significant source of airframe noise originates with the aircraft high lift system. In particular, slotted leading edge slats produce high noise levels because of the flow recirculation that occurs in a cove region located on a rear side of a deployed leading edge wing slat. Conventional wing slats are configured to mate with the leading edge of the aircraft wings so that each slat and wing together create a desired airfoil shape when the slat is retracted against the leading edge of the wing. In doing so, conventional slats may have a leading edge that is substantially shaped like the leading edge of the wing, but have a rear side that is generally concave in shape as it is shaped to mate with the generally convex leading edge of the wing. When the slat is extended forward and rotated downward for high lift operations, the concave shape of the rear side of the slat creates a cove in which the ambient airstream flowing around the slat recirculates, creating noise.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Concepts and technologies described herein provide for reducing aerodynamic noise levels associated with aircraft high lift systems. According to one aspect of the disclosure provided herein, a method for reducing aircraft noise includes deploying a slat from a leading edge of an aircraft wing. A leading edge element of the wing is then repositioned from a stowed position inside the wing to a deployed position. In the deployed position, the leading edge element forms a continuous outer mold line cross-sectional shape with the upper and lower surfaces of the wing.

According to another aspect, a high lift system includes a deployable leading edge wing slat and a leading edge element. The leading edge element of the aircraft wing is movable between a stowed position inside the wing and a deployed position outside the wing. When the deployable leading edge wing slat is extended, the leading edge element of the wing moves from the stowed position to the deployed position, where it forms a continuous outer mold line shape with the wing.

According to yet another aspect of the disclosure, a high lift system associated with an aircraft wing includes a main wing element, a rigid leading edge element, and a leading edge wing slat. The main wing element includes an upper wing surface and a lower wing surface. The rigid leading edge element is connected to the main wing element and is moveable so that it forms a continuous outer mold line shape of the aircraft wing when the rigid leading edge element is in a deployed position, and moves aft of the outer edges of the upper wing surface and lower wing surface to a stowed position. The leading edge wing slat is also connected to the main wing element and abuts the outer edges of the upper wing surface and lower wing surface to create a continuous outer mold line shape of the aircraft wing when the slat is retracted to a stowed position.

The features, functions, and advantages that have been discussed can be achieved independently in various embodiments of the present disclosure or may be combined in yet other embodiments, further details of which can be seen with reference to the following description and drawings.

DETAILED DESCRIPTION

Figure 1:
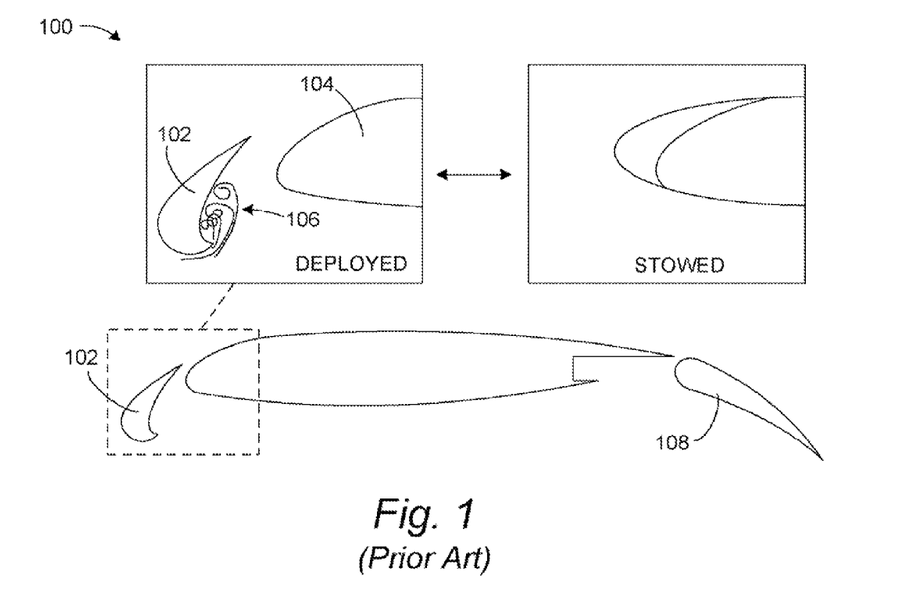
FIG. 1 is a cross-sectional view of a conventional high lift system showing a conventional leading edge slat in deployed and stowed configurations with corresponding noise-inducing airflow recirculation within the slat cove.

The following detailed description is directed to systems and methods for providing a high lift system that utilizes cove-filled leading edge wing slats to eliminate or reduce the noise-creating air recirculation associated with conventional leading edge wing slats. In the following detailed description, references are made to the accompanying drawings that form a part hereof, and which are shown by way of illustration, specific embodiments, or examples. Like numerals represent like elements through the several figures. Referring now to FIG. 1, a conventional high lift system 100 will be described.

The conventional high lift system 100 may include a conventional leading edge slat 102 and flap 108 that work together to alter the shape of an aircraft wing 104 to create additional aerodynamic lift. The conventional leading edge slat 102 is configured to mate with the leading edge of an aircraft wing 104 so that the conventional slat 102 and wing 104 together create a desired airfoil shape, as shown with the conventional slat 102 positioned in the stowed configuration. Because the conventional slat 102 and wing 104 must create a desired airfoil shape when the conventional slat 102 is retracted against the leading edge of the aircraft wing 104 in the stowed configuration, and because the aircraft wing 104 must retain an airfoil shape when the conventional slat 102 is extended to the deployed configuration, traditionally, the rear side of a conventional slat 102 has a concave shape that substantially corresponds to the convex shape of the leading edge of the aircraft wing 104 to allow the two surfaces to mate when the conventional slat 102 is stowed.

However, as discussed above, and as shown in FIG. 1, the concave shape of the rear side of the conventional slat 102 creates a cove region that results in a recirculation 106 of the ambient airflow as it flows around the conventional slat 102. It is this recirculation 106 of the ambient airflow that is the source of a substantial amount of noise during takeoff and landing operations. In addition to the noise created by the cove region of the conventional slat 102, the air recirculation 106 within the cove region is not aerodynamically optimal, reducing the amount of lift, increasing the amount of drag, thereby reducing the corresponding aircraft performance benefits that could result should this recirculation 106 be eliminated.

Figure 2:
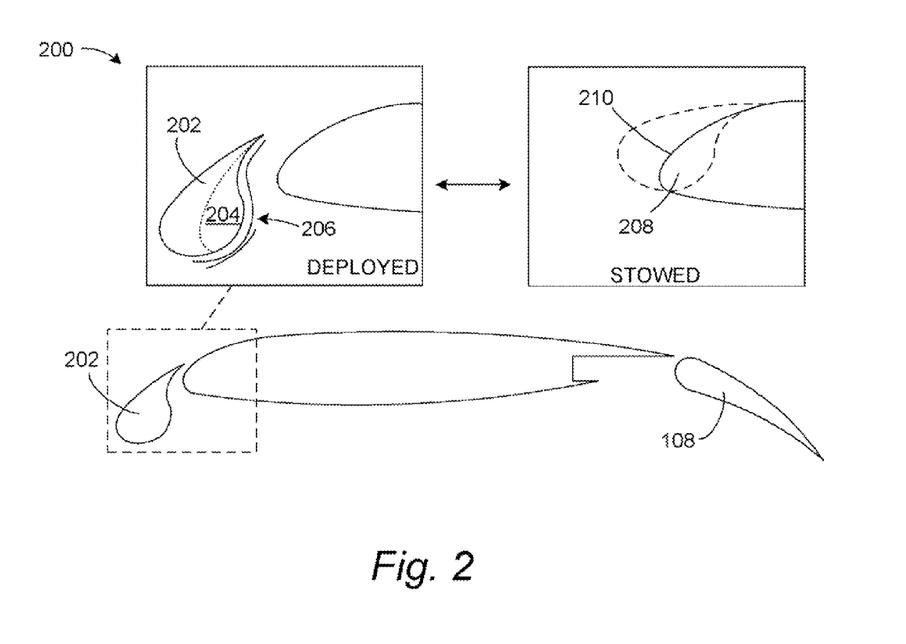
FIG. 2 is a cross-sectional view of a high lift system showing a cove-filled leading edge slat in deployed and stowed configurations according to various embodiments presented herein.

FIG. 2 illustrates a high lift system 200 that takes advantage of a cove-filled leading edge slat 202 to decrease or eliminate the air recirculation 106 and corresponding noise and performance degradation that results from the recirculation 106. As seen in FIG. 2, the leading edge wing slat is a cove-filled slat 202 in which the cove region 204 has been filled to eliminate the convex portion of the rear side of the slat that is common to a conventional slat 102. The filled cove region 204 provides a smooth, gradual turn for the ambient airflow, creating a substantially continuous flow 206 that substantially reduces the noise associated with the recirculation 106 present with conventional slats. It should be appreciated that the substantially continuous flow 206 may include laminar flow, turbulent flow, or a combination thereof according to the precise design characteristics of the high lift system 200 and the corresponding flight characteristics at any given instance. However, the cove-filled leading edge slat 202 substantially reduces or eliminates the considerable recirculation 106 that is present within the cove of the conventional slat 102, which substantially reduces the airframe noise associated with this recirculation 106.

The cove-filled slat 202 may be shaped and sized according to the specific application and corresponding desirable aerodynamic properties. According to the various embodiments described herein, the cove-filled slat is rigid so that the rear side of the cove-filled slat 202 is not flexible or inflatable in that it retains the same cross-sectional shape when deployed as when stowed. Various implementations and further details with respect to the cove-filled slat 202 are described in co-pending U.S. patent application Ser. No. 12/751,468, entitled "Low Noise Wing Slat System With Rigid Cove-Filled Slat" and filed concurrently with the present application on Mar. 31, 2010, which is herein incorporated by reference in its entirety.

As seen in FIG. 2, the stowed configuration of the cove-filled slat 202 creates an overlap area 208 in which the cove region 204 overlaps or interferes with the leading edge 210 of a conventional aircraft wing 104. Utilizing the concepts and technologies described herein, this overlap area 208 is accommodated by a moveable leading edge element that retracts and deploys in coordination with the cove-filled slat 202. As the cove-filled slat 202 is retracted to the stowed position, the leading edge element retracts to a stowed position inside of the aircraft wing to accommodate the cove region 204 of the cove-filled slat 202. Similarly, as the cove-filled slat 202 is extended from the wing to a high lift position forward of the aircraft wing, the leading edge element deploys from the stowed position inside the wing to a deployed position that completes a continuous outer mold line shape with the upper and lower surfaces of the wing. Methods for resolving the overlap area 208 utilizing a fixed leading edge of the aircraft wing 104 are described in co-pending U.S. patent application Ser. No. 12/751,514, entitled "Low Noise Wing Slat System With A Fixed Wing Leading Edge And Deployable Bridging Panels" and filed concurrently with the present application on Mar. 31, 2010, which is herein incorporated by reference in its entirety.

Figure 3:
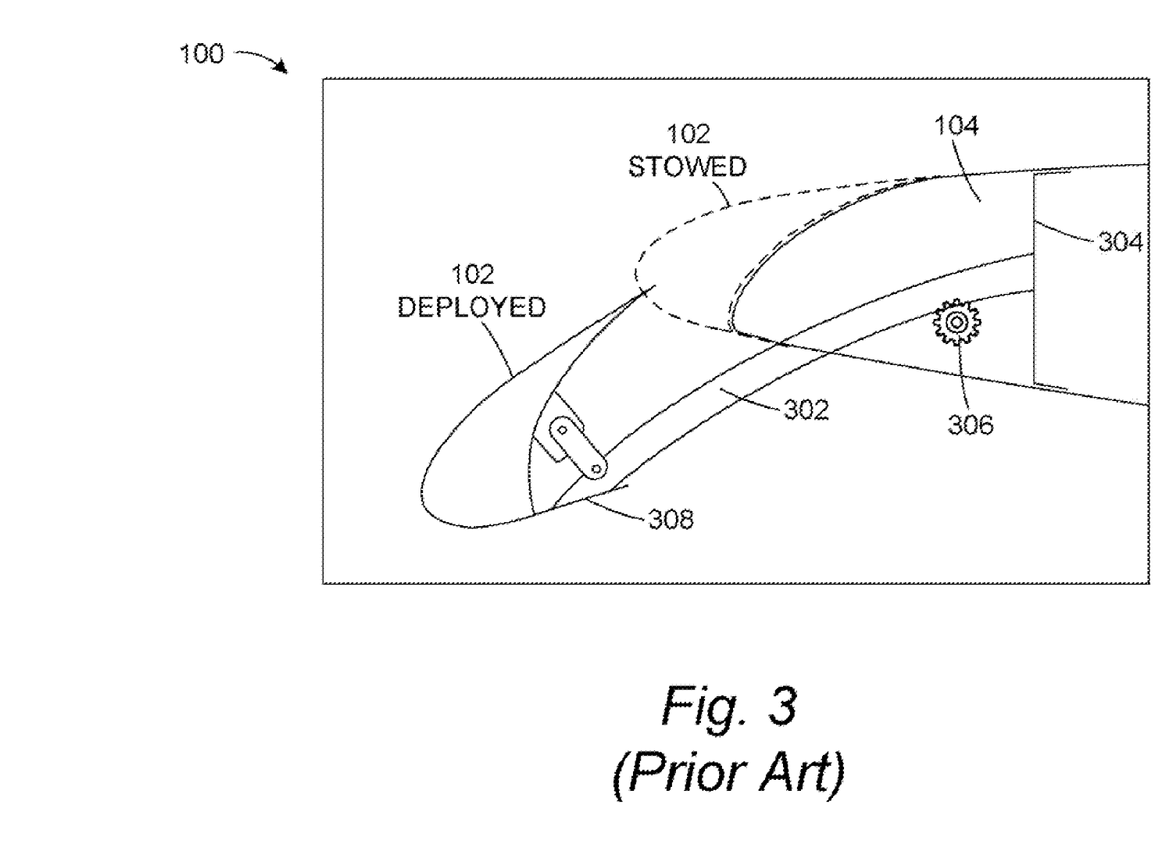
FIG. 3 is a cross-sectional view of a conventional high lift system showing a conventional leading edge slat in a deployed configuration.

Prior to discussing the various embodiments associated with the cove-filled slat 202 and corresponding high lift system 200, the conventional high lift system 100 will be discussed in greater detail with respect to FIG. 3 for comparison purposes. Looking at FIG. 3, the conventional slat 102 is shown in solid lines in the deployed position. The conventional slat 102 is depicted in broken lines in the stowed position. As seen in the stowed position, a rear side of the conventional slat 102 is generally concave to compliment the generally convex leading edge of the aircraft wing 104. A guide rail 302 connects the conventional slat 102 to the wing spar 304 or other structural component of the aircraft wing 104. A rotary actuator and pinion gear 306 operate to extend and retract the conventional slat 102 on the guide rail 302 between the deployed and stowed positions.

It can be seen that the guide rail 302 may be connected to the conventional slat 102 via a bottom plate 308. This bottom plate 308 not only provides a connection point for the guide rail 302, but also provides an aerodynamic transition between the bottom side of the conventional slat 102 and a lower surface of the aircraft wing 104, guiding the ambient airflow around the conventional slat 102 and the lower surface of the aircraft wing 104 when the slat is configured in the stowed position. However, when the conventional slat 102 is configured in the deployed position, the bottom plate 308, coupled with the concave shape of the rear surface of the slat, creates the cove in which the noise producing air recirculation 106 occurs as the ambient airflow streams around the bottom of the slat.

Figure 4:
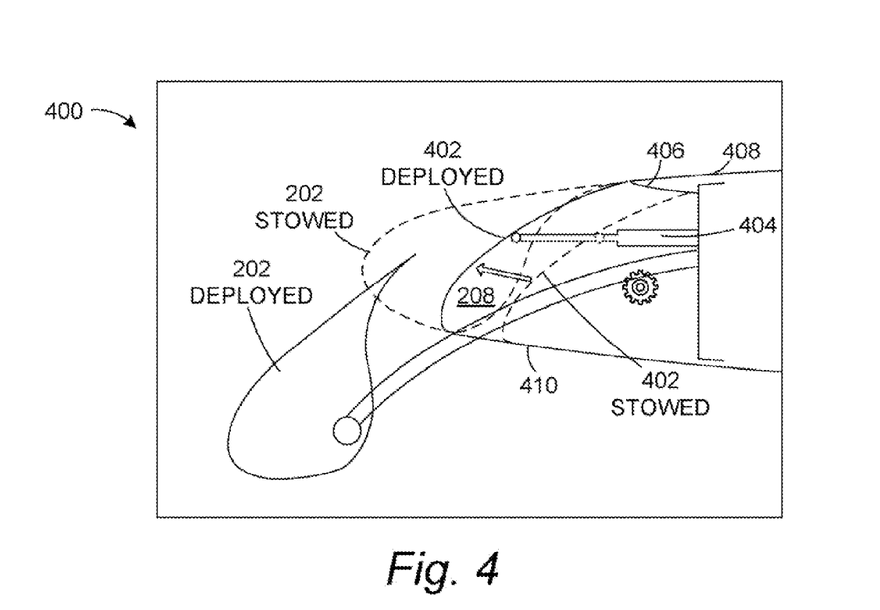
FIG. 4 is a cross-sectional view of a high lift system showing a one-piece leading edge element in deployed and stowed configurations according to various embodiments presented herein.

Turning now to FIG. 4, a first embodiment of a low noise high lift system will be discussed. According to this embodiment, a high lift system 400 includes a cove-filled slat 202, a main wing element, and a leading edge element. The main wing element includes an upper wing surface 408 and a lower wing surface 410, as well as the structural and other components within the aircraft wing 104. According to this embodiment, the leading edge element includes a one-piece panel 402 that is moveable between a stowed position and a deployed position.

The one-piece panel 402 may be made from the same structural and aircraft skin materials as the main wing element and/or the cove-filled slat 202. The one-piece panel 402 has an outer surface that is generally convex and is shaped according to a desired cross-sectional outer mold line shape of the aircraft wing when the cove-filled slat 202 is deployed to a high lift position. In other words, when the one-piece panel 402 is configured in the deployed position, a top edge of the panel is adjacent to the upper wing surface 408 and a lower edge of the panel is adjacent to the lower wing surface 410 so that the one-piece panel becomes the leading edge of the main wing element. A cross-section of the aircraft wing with the one-piece panel 402 in the deployed position reveals a continuous outer mold line that represents a desired airfoil shape.

When the one-piece panel 402 is configured in the stowed position, the panel rests within the main wing element, aft of the outer edges of the upper and lower wing surfaces. By moving the one-piece panel 402 aft of the deployed position, space becomes available within the wing for the overlap area 208 described above. Consequently, by utilizing a moveable leading edge element with the aircraft wing, the leading edge slat disclosed herein is not limited to having a concave rear surface, as is the situation within a conventional high lift system 100.

According to one embodiment, the one-piece panel 402 translates between the stowed and deployed positions using a linear actuator 404. It should be appreciated that a rotary actuator and pinion gear may alternatively be used, as well as any other type of actuator, including all types of hydraulic, pneumatic, or electrical actuators. To assist in properly transitioning the one-piece panel 402 between the deployed and stowed positions, a guide 406 may be utilized to route and/or rotate the panel into place. Alternatively, one or more tracks may be used to guide the one-piece panel between configurations.

Figure 5:
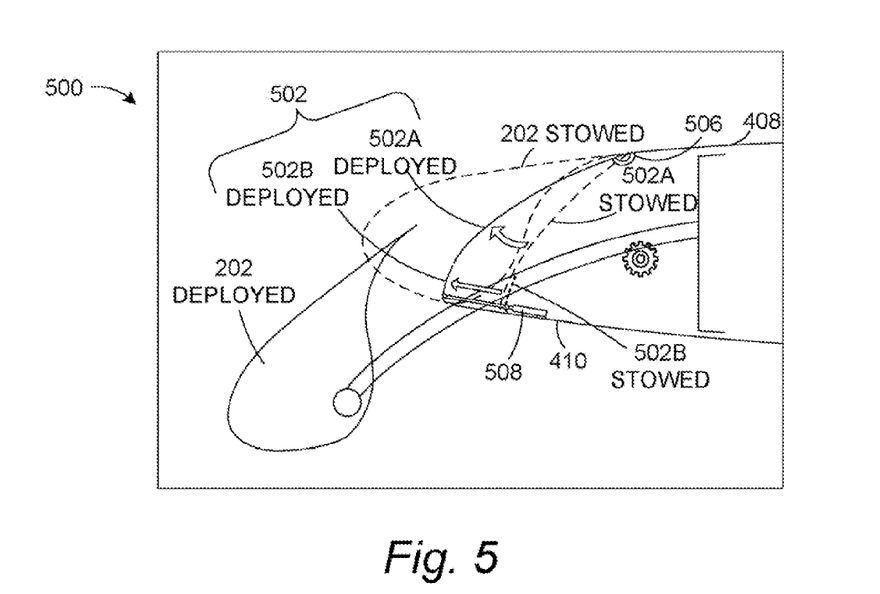
FIG. 5 is a cross-sectional view of a high lift system showing a two-piece leading edge element in deployed and stowed configurations according to various embodiments presented herein.

Turning now to FIG. 5, a second embodiment of a low noise high lift system will be discussed. According to this embodiment, a high lift system 500 includes the cove-filled slat 202, the main wing element, and a leading edge element, as described above with respect to the FIG. 4. However, with the high lift system 500, instead of the leading edge element including a one-piece panel 402, the leading edge element is made up of a two-piece panel 502. The two-piece panel 502 includes an upper panel 502A and a lower panel 502B. Each panel of the two-piece panel 502 moves independently between the deployed position and the stowed position.

According to one embodiment, the upper panel 502A is attached at an upper edge of the panel to the main wing element via a hinge and actuator 506. When the cove-filled slat 202 is deployed, the upper panel 502A rotates outward to the deployed position. Conversely, when the cove-filled slat 202 is retracted, the upper panel 502A rotates inward to the stowed position. The lower panel 502B is attached to the main wing element via a traverse actuator that operates to push the lower panel 502B outward to the deployed position and to pull the lower panel 502B inward to the stowed position in conjunction with the deployment and retraction of the cove-filled slat 202 and the upper panel 502A. In the stowed positions, the upper panel 502A and the lower panel 502B overlap one another. This configuration may provide an advantage over the one-piece panel 402 high lift system 400 when stowage space within the main wing element for the leading edge element is to be minimized Due to the overlapping design of the two-piece panel 502, less space within the wing upstream of the wing spar 304 is required for retraction and stowage of the leading edge element as compared to a one-piece panel 402 high lift system 400.

It should be clear from the illustrative view of the high lift system 500 shown in FIG. 5 that at full deployment of the high lift system 500, the cove-filled slat 202 is extended and rotated downward into a high lift configuration, while the upper panel 502A is rotated outward and the lower panel 502B is pushed outward into the deployed positions. In the deployed positions, the upper and lower panels 502A and 502B, combined with the fixed wing skin panels of the upper wing surface 408 and lower wing surface 410, form the main wing contour or outer mold line shape. This outer mold line shape may be similar or identical to the outer mold line shape of a conventional high lift system 100, however allowing for the use of a cove-filled slat 202. The combination of the smooth, continuous outer mold line shape of the deployed high lift system 500, coupled with the smooth transition from the front surface of the cove-filled slat 202 to the rear surface of the cove-filled slat, allows for smooth airflow through the high lift system 500 and a corresponding reduction in noise.

It should be appreciated that the one-piece panel 402 and the two-piece panel 502 described herein accommodate a cove-filled slat 202, or any slat that does not have a rear surface that conforms with the leading edge 202 of a corresponding aircraft wing 104, by retracting within an interior space of the wing when the slat is stowed. The various embodiments are not limited to any particular mechanism for deploying or retracting the leading edge element of the present disclosure. For example, while embodiments may be described as utilizing linear actuators, rotary actuators, and/or pinion gears, any combination of these translation mechanisms or any other types of translation mechanisms may be utilized within the scope of this disclosure.

Figure 6:
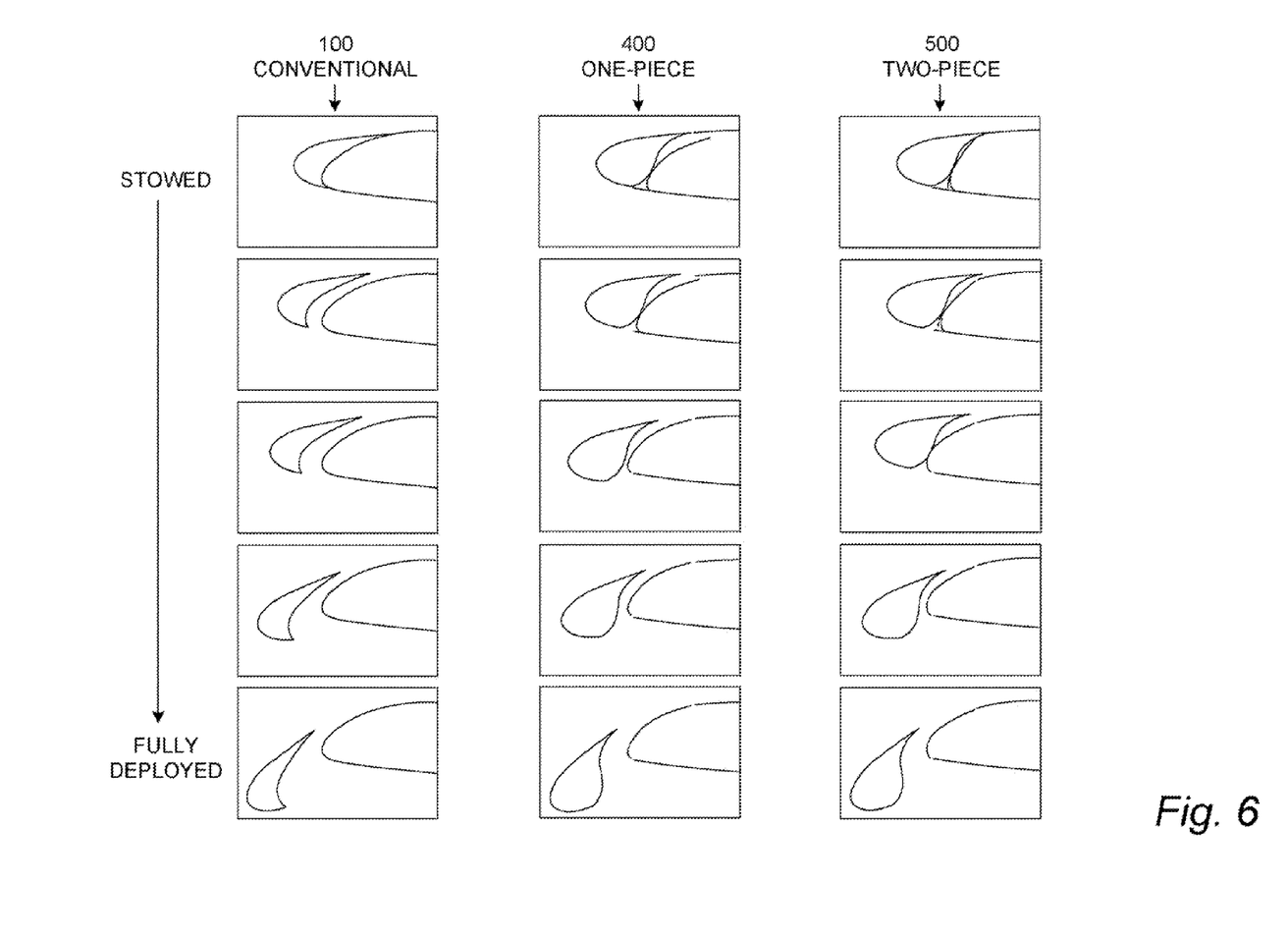
FIG. 6 is a graphical depiction of a conventional high lift system, a high lift system utilizing a one-piece leading edge element, and a high lift system utilizing a two-piece leading edge element during deployment operations according to various embodiments presented herein.

Turning to FIG. 6, an illustrative series of diagrams depicting progressive stages of deployment of a conventional high lift system 100, a high lift system 400 utilizing a moveable leading edge element that includes a one-piece panel 402, and a high lift system 500 utilizing a moveable leading edge element that includes a two-piece panel 502 will be described. For simplicity in light of the large number and relatively small size of the various diagrams, the diagrams of FIG. 6 are shown without identifying the various components with reference numbers, although reference numbers will be used in this description for clarity purposes.

As seen in FIG. 6, the three systems are shown side-by-side for comparison purposes. Starting at the top and moving downwards, the systems begin in stowed configurations and progress through the deployment process until the slats and leading edge elements, where applicable, are fully deployed into high lift positions. It can be seen that the deployment of the conventional high lift system 100 includes the extension and downward rotation of the conventional slat 102. As previously discussed, because the conventional slat 102 is designed to abut and conform to the leading edge of the aircraft wing 104 when stowed, the rear surface of the slat is concave, which creates the cove that induces air recirculation 106 and creates undesirable noise.

The one-piece panel 402 can be seen in the top central diagram in a stowed position within the aircraft wing 104. In this stowed configuration, the cove-filled slat 202 abuts outer edges of the upper and lower wing surfaces 408 and 410 so that the cove-filled slat 202, the upper wing surface 408, and the lower wing surface 410 together create the continuous outer mold line shape of the airfoil. It should be understood that gaps are shown in the diagrams between the cove-filled slat 202 and the upper and lower wing surfaces 408 and 410 when the slat is stowed, as well as between the moveable leading edge elements and the upper and lower wing surfaces 408 and 410 when the moveable leading edge elements are deployed, for clarity purposes to distinguish between the various components. However, in practice, the adjacent surfaces may abut one another to create a smooth, continuous outer mold line shape of the airfoil, without any gaps.

During deployment, the cove-filled slat 202 extends and rotates outward and downward, while the one-piece panel 402 is pushed outward until the outer edges of the panel are adjacent to the edges of the upper wing surface 408 and the lower wing surface 410. In this deployed position, shown in the bottom central diagram, the cove-filled slat 202 provides a smooth, gradual turning radius around the lower rear side of the slat in order to eliminate the air recirculation 106 and decrease associated noise, while the one-piece panel 402 aligns with the upper wing surface 408 and lower wing surface 410 to create the continuous outer mold line shape of the airfoil.

The two-piece panel 502 can be seen in the top right diagram in a stowed position within the aircraft wing 104. As with the one-piece panel 402, in the stowed configuration, the cove-filled slat 202 of the high lift system 500 abuts the outer edges of the upper and lower wing surfaces 408 and 410 so that the cove-filled slat 202, the upper wing surface 408, and the lower wing surface 410 together create the continuous outer mold line shape of the airfoil. During deployment, the cove-filled slat 202 extends and rotates outward and downward, while the upper panel 502A rotates outward and the lower panel 502B is pushed outward into the deployed position. In this deployed position, shown in the bottom right diagram, the cove-filled slat 202 provides a smooth, gradual turning radius around the lower rear side of the slat in order to eliminate the air recirculation 106 and decrease associated noise, while the two-piece panel 502 aligns with the upper wing surface 408 and lower wing surface 410 to create the continuous outer mold line shape of the airfoil.

Figure 7:
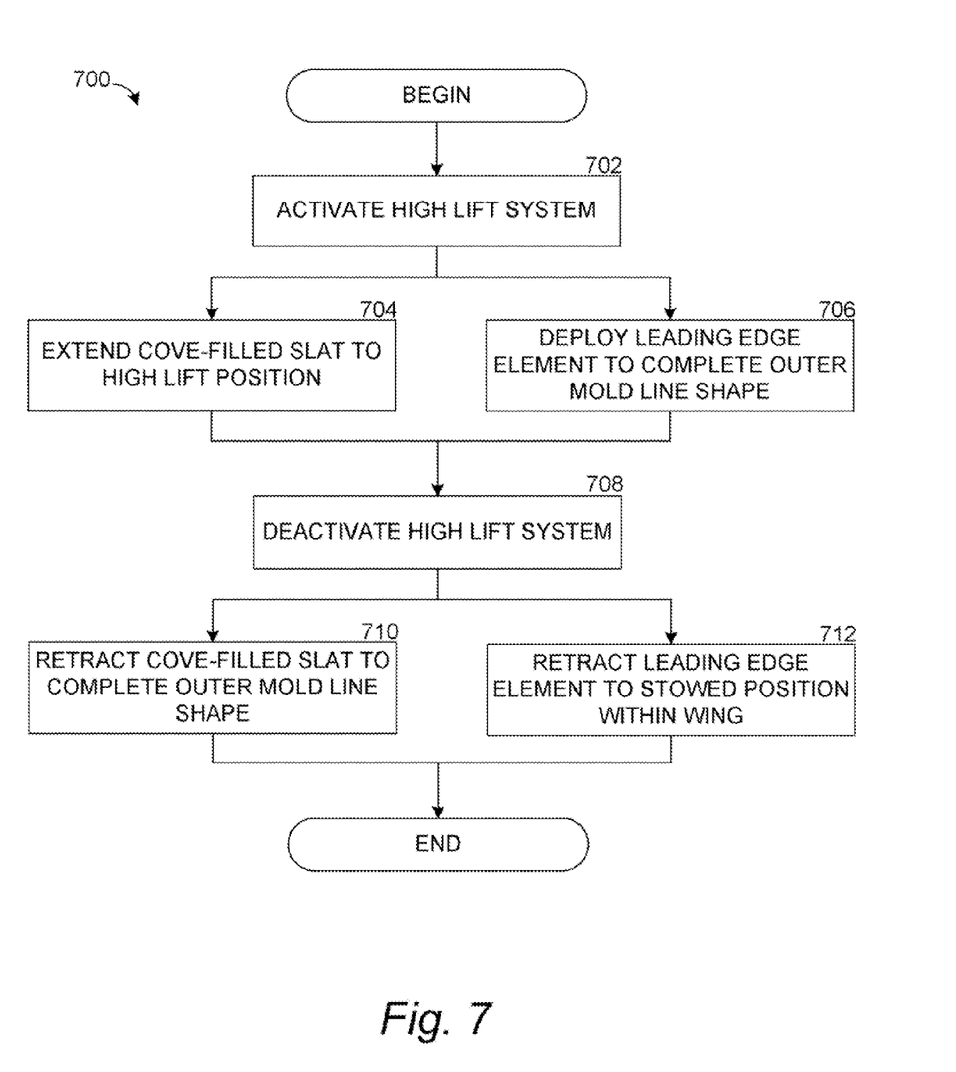
FIG. 7 is a flow diagram showing a method for reducing aircraft noise associated with a high lift system according to various embodiments presented herein.

Turning now to FIG. 7, an illustrative routine 700 for providing a reduced noise, high lift system for aircraft takeoff and landing operations will now be described in detail. It should be appreciated that more or fewer operations may be performed than shown in the figures and described herein. These operations may also be performed in a different order than those described herein.

The routine 700 begins at operation 702, where the high lift system (400, 500) is activated. The activation may be initiated via a cockpit switch or by a flight computer system upon detection and analysis of any quantity and type of flight criteria that indicates that the deployment of the cove-filled slats 202 is desirable and proper. Upon activation of the high lift system (400, 500), the routine 700 continues substantially simultaneously to operations 704 and 706. At operation 704, the cove-filled slat 202 is extended to the high lift position from the stowed position. At operation 706, the leading edge element is deployed to complete the continuous outer mold line shape with the upper wing surface 408 and the lower wing surface 410 of the aircraft wing 104. As discussed in detail above, the leading edge element may be a one-piece panel 402 or a two-piece panel 502. It should be appreciated that the leading edge element may alternatively include any number of panels having any number and type of deployment mechanisms. Although not shown, it should be appreciated that the deployment of the cove-filled slat 202 may occur simultaneously with the deployment of the flap 108, which increases the lift created by the aircraft wing 104.

When the high lift system (400, 500) is no longer needed, it is deactivated at operation 708. As with the activation, the deactivation may be via a manual selection of a switch or toggle, or may be automated by a flight computer according to current flight criteria. Upon deactivation of the high lift system (400, 500), the routine 700 continues substantially simultaneously to operations 710 and 712. At operation 710, the cove-filled slat 202 is retracted until the slat is adjacent to the outer edges of the upper and lower wing surfaces 408 and 410 in a position that completes the continuous outer mold line shape of the aircraft wing 104. At operation 712, the one-piece panel 402 or the two-piece panel 502 is retracted to the stowed position within a forward cavity of the aircraft wing 104, and the routine 700 ends. Although not shown, it should again be appreciated that the retraction of the cove-filled slat 202 may occur simultaneously with the retraction of the flap 108.

It should be understood from the above disclosure that the concepts presented herein provide a solution to the negative affect that conventional slats 102 have on the creation of noise during takeoff and landing operations. In addition to reducing the noise associated with the recirculation 106 in the cove region of conventional slats 102, the use of cove-filled slats 202 and corresponding moveable leading edge elements (402, 502) has a benefit of enhancing the takeoff performance of an aircraft.

By filling in the cove region of the conventional slats 102 and eliminating the air recirculation 106, the drag associated with the air recirculation 106 is significantly reduced. A reduction in drag allows for an increased aircraft payload, an increase in aircraft range, a decreased runway distance, and/or smaller engines since less thrust is required to overcome airplane drag. A decrease in the engine size and/or thrust output has direct and favorable implication to aircraft weight, fuel consumption, and general eco-friendliness.

Based on the foregoing, it should be appreciated that technologies for providing a low noise, high lift system have been disclosed herein. It is to be understood that the invention defined in the appended claims is not necessarily limited to the specific features, configurations, acts, or media described herein. Rather, the specific features, configurations, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. A method for reducing aircraft noise associated with a high lift system, comprising:
deploying a slat from a leading edge of an aircraft wing to a high lift position, the slat having substantially the same shape when deployed as when stowed and providing for a substantially continuous airflow there around when deployed; and
repositioning at least one leading edge element from a stowed position inside the aircraft wing to a deployed position at the front of and projecting from the aircraft wing that creates a continuous outer mold line cross-sectional shape of the aircraft wing defined by an upper wing surface, the at least one leading edge element, and a lower wing surface, wherein the leading edge element abuts an outer edge of the upper wing surface and an outer edge of the lower wing surface in the deployed position.

2. The method of claim 1, wherein the at least one leading edge element comprises a one-piece panel, and wherein repositioning the one-piece panel comprises linearly translating the one-piece panel outwards to the deployed position where a top edge of the one-piece panel is adjacent to the upper wing surface and a bottom edge of the one-piece panel is adjacent to the lower wing surface.

3. The method of claim 2, wherein linearly translating the one-piece panel comprises extending a linear actuator connected to the one-piece panel.

4. The method of claim 1, wherein the at least one leading edge element comprises a two-piece panel having an upper panel and a lower panel, and wherein repositioning the two-piece panel comprises rotating the upper panel outwards to the deployed position and linearly translating the lower panel outwards to the deployed position such that a top edge of the upper panel is adjacent to the upper wing surface, a bottom edge of the upper panel is adjacent to a top edge of the lower panel, and a bottom edge of the lower panel is adjacent to the lower wing surface.

5. The method of claim 1, further comprising:
retracting the slat from the high lift position to the leading edge of the aircraft wing; and
repositioning the at least one leading edge element from the deployed position that creates the continuous outer mold line cross-sectional shape of the aircraft wing to the stowed position inside the aircraft wing.

6. The method of claim 5, wherein the at least one leading edge element comprises a one-piece panel, and wherein repositioning the one-piece panel comprises linearly translating the one-piece panel inwards from the deployed position in which a top edge of the one-piece panel is adjacent to the upper wing surface and a bottom edge of the one-piece panel is adjacent to the lower wing surface, to the stowed position inside the aircraft wing.

7. The method of claim 5, wherein the at least one leading edge element comprises a two-piece panel having an upper panel and a lower panel, and wherein repositioning the two-piece panel comprises rotating the upper panel inwards within the aircraft wing from the deployed position to the stowed position within the aircraft wing and linearly translating the lower panel inwards from the deployed position to the stowed position within the aircraft wing.

8. A high lift system, comprising:
a deployable leading edge wing slat having substantially the same shape when deployed as when stowed and providing for a substantially continuous airflow there around when deployed; and
at least one leading edge element movable between a stowed position within an aircraft wing and a deployed position at the front of and projecting from the aircraft wing such that when the deployable leading edge wing slat deploys, the at least one leading edge element is configured to move from the stowed position to the deployed position and form a substantially continuous outer mold line shape with the aircraft wing, wherein the leading edge element abuts an outer edge of the upper wing surface and an outer edge of the lower wing surface in the deployed position.

9. The high lift system of claim 8, wherein the at least one leading edge element comprises a one-piece panel.

10. The high lift system of claim 9, further comprising a linear actuator mounted within the aircraft wing and attached to the one-piece panel, the linear actuator configured to drive the one-piece panel from the stowed position within the aircraft wing to the deployed position outside the aircraft wing upon deployment of the leading edge wing slat.

11. The high lift system of claim 8, wherein the at least one leading edge element comprises a two-piece panel.

12. The high lift system of claim 11, wherein the two-piece panel comprises an upper panel and a lower panel, and wherein the high lift system further comprises a traverse actuator mounted within the aircraft wing and attached to the lower panel, the traverse actuator configured to drive the lower panel from the stowed position within the aircraft wing to the deployed position outside the aircraft wing upon deployment of the leading edge wing slat and to retract the lower panel from the deployed position to the stowed position upon retraction of the leading edge wing slat.

13. The high lift system of claim 12, wherein the upper panel is rotatably connected at a top edge to an upper wing surface of the aircraft wing such that the upper panel is operative to rotate outward around the top edge to the deployed position and to rotate inward around the top edge to the stowed position.

14. The high lift system of claim 8, wherein the aircraft wing comprises an upper wing surface, a lower wing surface, and the at least one leading edge element such that the upper wing surface, the lower wing surface, and the at least one leading edge element form a continuous outer mold line shape when the deployable leading edge wing slat is deployed and a discontinuous outer mold line shape when the deployable leading edge wing slat is refracted in the stowed position.

15. The high lift system of claim 8, wherein the at least one leading edge element comprises at least one rigid structure, and wherein moving the at least one rigid structure comprises mechanically moving the at least one rigid structure via at least one actuator.

16. A high lift system associated with an aircraft wing, comprising:
a main wing element comprising an upper wing surface and a lower wing surface;
a rigid leading edge element moveably connected to the main wing element, the rigid leading edge element comprising an upper panel and a lower panel, the upper panel being rotatably connected to the outer edge of the upper wing surface and configured to rotate forward to the deployed position and to rotate aft into the main wing element to the stowed position, the lower panel being configured to linearly translate forward to the deployed position and to linearly translate aft into the main wing element to the stowed position, wherein the rigid leading edge element abuts an outer edge of the upper wing surface and an outer edge of the lower wing surface to form a continuous outer mold line shape of the aircraft wing when the rigid leading edge element is configured in a deployed position, and wherein the rigid leading edge element is positioned aft of the outer edge of the upper wing surface and the outer edge of the lower wing surface when configured in a stowed position; and
a leading edge wing slat operatively connected to the main wing element, having substantially the same shape when deployed as when stowed, and providing for a substantially continuous airflow there around when deployed, wherein the leading edge wing slat abuts the outer edge of the upper wing surface and the outer edge of the lower wing surface to form the continuous outer mold line shape of the aircraft wing when the leading edge wing slat is retracted to a stowed position.

17. The high lift system of claim 16 wherein the leading edge wing slat has a rear surface which does not conform to the leading of the main wing element.

18. The high lift system of claim 16 and further comprising a traverse actuator mounted within the aircraft wing and attached to the lower panel, and configured to drive the lower panel from the stowed position to the deployed position, and to retract the lower panel from the deployed position to the stowed position.

19. The high lift system of claim 16 and further comprising an actuator mounted within the aircraft wing and attached to the upper panel, and configured to rotate the upper panel outward from the stowed position to the deployed position, and to rotate the upper panel inward from the deployed position to the stowed position.

\* \* \* \* \*